United States Patent [19]
Horst et al.

[11] Patent Number: 5,894,866
[45] Date of Patent: Apr. 20, 1999

[54] GARDEN HOSE ASSEMBLY HAVING HOLDING MEANS ADAPTED TO BE COILED AROUND AN ASSOCIATED SUPPORT AND METHOD OF MAKING SAME

[75] Inventors: Leonard D. Horst; Kevin C. Assenheimer, both of Bucyrus, Ohio

[73] Assignee: Dayco Products, Inc., Dayton, Ohio

[21] Appl. No.: 08/904,404

[22] Filed: Jul. 31, 1997

[51] Int. Cl.$^6$ .................................................. F16L 55/00
[52] U.S. Cl. ................ 138/172; 138/103; 138/DIG. 8; 239/587.1
[58] Field of Search ................. 138/172, DIG. 8, 138/103, 106, 118, 121; 239/588, 587.1, 269

[56] References Cited

U.S. PATENT DOCUMENTS

| | | | |
|---|---|---|---|
| 2,704,556 | 3/1955 | Blish | 138/DIG. 8 X |
| 3,032,357 | 5/1962 | Shames et al. | 285/114 |
| 4,307,754 | 12/1981 | Muratsubaki | 138/DIG. 8 X |
| 4,327,775 | 5/1982 | Tally | 138/103 |
| 4,456,034 | 6/1984 | Bixby | 138/DIG. 8 X |
| 4,463,775 | 8/1984 | Wink et al. | 138/125 |
| 4,669,508 | 6/1987 | Neaves | 138/DIG. 8 X |
| 4,842,174 | 6/1989 | Sheppard et al. | 138/DIG. 8 X |
| 4,966,202 | 10/1990 | Bryan et al. | 2138/172 |
| 5,082,028 | 1/1992 | Jean-Jacques | 138/DIG. 8 X |
| 5,263,646 | 11/1993 | McCauley | 239/154 |
| 5,573,039 | 11/1996 | Mang | 138/DIG. 8 X |

OTHER PUBLICATIONS

Cedarberg Industries, Inc.—Brochure entitled "Snap Lock Systems", at pp. 4–7 and 42–43.

Mr. Twist™ Flexible Light Brochure by DWI Co. Ltd., 1992.

*Primary Examiner*—Patrick Brinson
*Attorney, Agent, or Firm*—Joseph V. Tassone

[57] ABSTRACT

A garden hose assembly is provided and comprises holding means comprising at least a portion of such hose assembly with the holding means and portion being adapted to be coiled around an associated support for holding the portion at a desired position to enable use of the hose assembly in a hands-free manner.

24 Claims, 4 Drawing Sheets

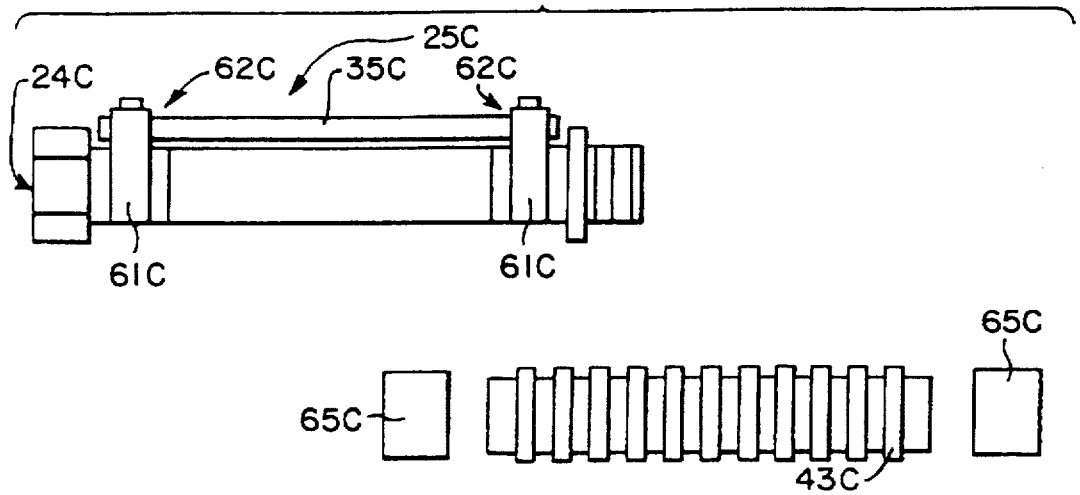
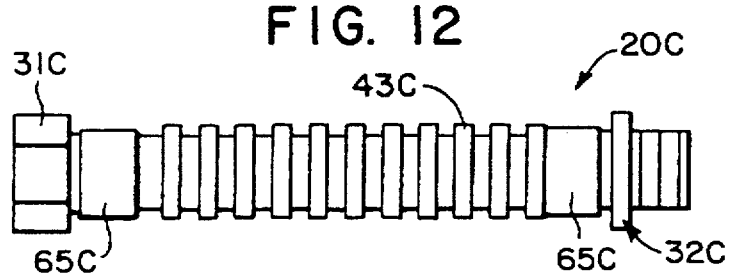
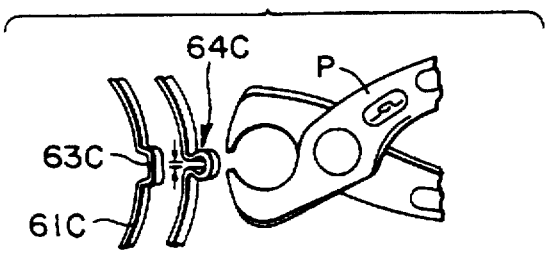

GARDEN HOSE ASSEMBLY HAVING HOLDING MEANS ADAPTED TO BE COILED AROUND AN ASSOCIATED SUPPORT AND METHOD OF MAKING SAME

BACKGROUND OF THE INVENTION

1. Field of the Invention

This invention relates to an improved garden assembly having integral holding means and to a method of making such a garden hose assembly.

2. Prior Art Statement

It is known to provide a formable shape retentive hose as shown in U.S. Pat. No. 4,463,779. It is also known to provide a formable hose with a reformable insert as shown in U.S. Pat. No. 4,327,775. It is also known to provide a shape retention hose construction as shown in U.S. Pat. No. 4,966,202. It is also known to provide a high pressure paint sprayer wand wherein the wand is retained within a bendable sheath which retains its shape when bent as shown in U.S. Pat. No. 5,263,646. It is also known to provide a flexible shower arm as disclosed in U.S. Pat. No. 3,032,357. It is also known to provide a hose made of various segments which once put together are capable of being bent into a plurality of preformed configurations as shown in the Cedarberg Industries Inc. brochure entitled Snap Lock Systems at pages 4–7 and 42–43.

It is also known to provide a flexible light sold under the name Mr. Twist by DWI Co. LTD comprised of a light in association with batteries and having a cable assembly disposed between the light and batteries and such cable assembly is capable of being twisted into various shapes to fasten the light at any desired position and as shown in a the two page brochure regarding same.

SUMMARY OF THE INVENTION

It is one feature of this invention to provide an improved garden hose assembly having integral holding means comprising at least a portion of the garden hose assembly with the holding means and portion being adapted to be coiled around as associated support for holding the portion at a desired position.

In particular, it has been found according to the teachings of this invention that a garden hose assembly is provided in which the holding means comprises a deformable device and means supporting the device on the portion of the garden hose assembly.

Another feature of this invention is to provide a garden hose assembly having inside surface means defining a water-conveying passage therethrough and having holding means comprising at least a portion of the hose assembly with the holding means and portion being adapted to be coiled around an associated support for holding the portion at a desired position and wherein the holding means comprises a deformable metal wire.

Accordingly, it is an object of this invention to provide a new and improved garden hose assembly having one or more of the novel features of this invention as set forth above or hereinafter shown or described.

Another object of this invention is provide a new method of making a garden hose assembly having one or more of the novel features of this invention as set forth above or hereinafter shown or described.

Another object of this invention is to provide a novel kit usable with an ordinary garden hose assembly and wherein such kit comprises holding means adapted to be used with a portion of the ordinary garden hose assembly and coiled around an associated support for holding the portion of the garden hose at any desired position.

Another object of this invention is to provide a new method of holding a garden hose assembly at any desired position to enable water to be sprayed or otherwise directed toward any object without requiring that a user of the garden hose assembly hold same.

Other details, features, objects, uses and advantages of this invention will become apparent from the embodiments thereof presented in the following specification, claims, and drawings.

BRIEF DESCRIPTION OF THE DRAWINGS

FIG. 11 illustrates the components and method of making another exemplary embodiment of the garden hose assembly of this invention.

FIG. 12 is a view illustrating the completed garden hose assembly after assembly of the components shown in FIG. 11.

FIG. 13 illustrates the manner in which a deformable wire comprising the garden hose assembly of FIGS. 11–12 is fastened in position.

DESCRIPTION OF PREFERRED EMBODIMENTS

Figure 1:
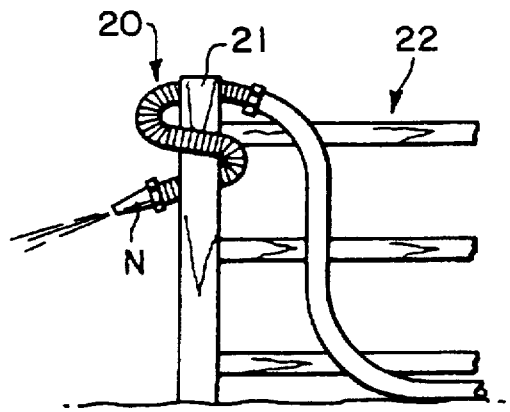
FIG. 1 is a fragmentary view illustrating one exemplary embodiment of the garden hose assembly of this invention held in position by integral holding means thereof on an associated post of a fence.

Reference is now made to FIG. 1 of the drawings which illustrates one exemplary embodiment of the garden hose assembly of this invention which is designated generally by the reference numeral 20. The garden hose assembly 20 has integral holding means (to be subsequently described) comprising at least a portion of the hose assembly and holding means and portion of the hose assembly are adapted to be coiled around an associated support, which in this example is in the form of a fence post 21, for holding the portion of the hose assembly at a desired position. The post 21 comprises a part of a fence 22 in this example of the invention.

Figure 2:
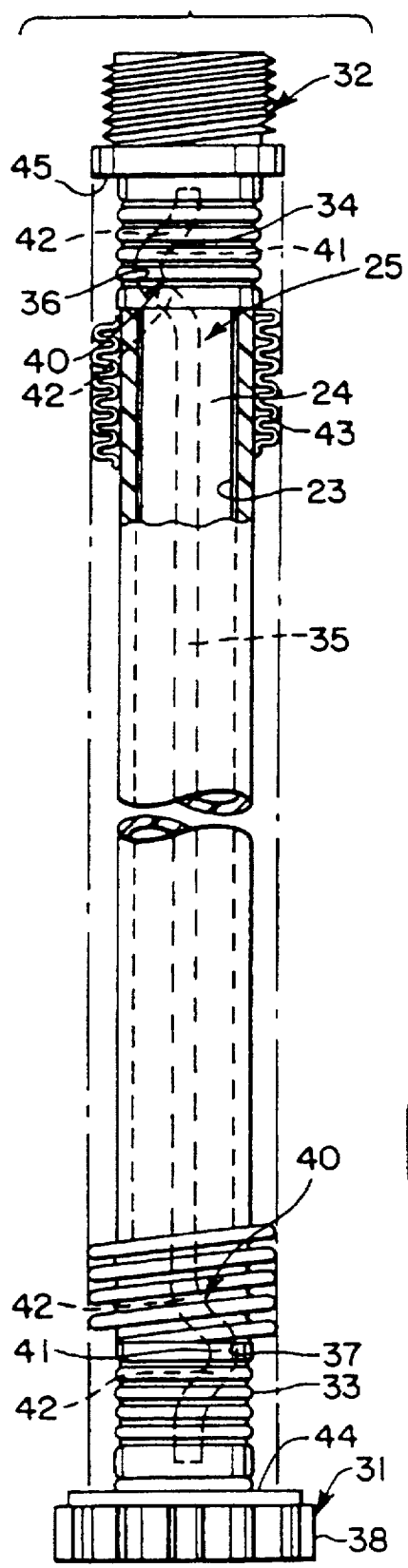
FIG. 2 is an enlarged view of the exemplary embodiment of a garden hose assembly of FIG. 1 with parts in cross sections, parts in elevation, parts broken away and parts shown by dot dash lines.

As seen in FIG. 2, the garden hose assembly 20 has inside surface means 23 defining a water conveying passage 24 therethrough and the holding means is designated generally by the reference numeral 25. The holding means 25 comprises at least a portion of the hose assembly 20 and in this exemplary embodiment the holding means comprises the major portion of such hose assembly 20 and is supported and extends along such major portion. The major portion is substantially the entire length of the hose assembly 20.

Figure 3:
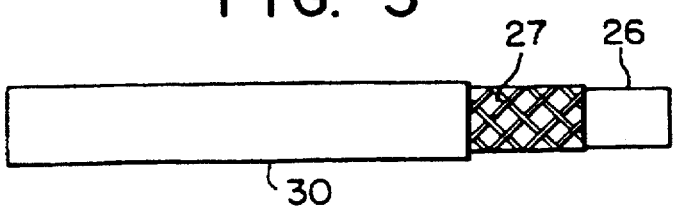
FIG. 3 is a view showing the main polymeric portion of the garden hose assembly of FIG. 2.
Figure 4:
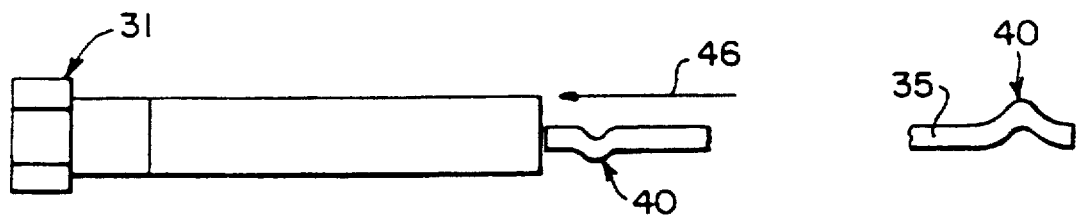
FIGS. 4 through 7 illustrate a series of steps showing the manner in which the garden hose assembly of FIG. 2 is assembled.
Figure 5:
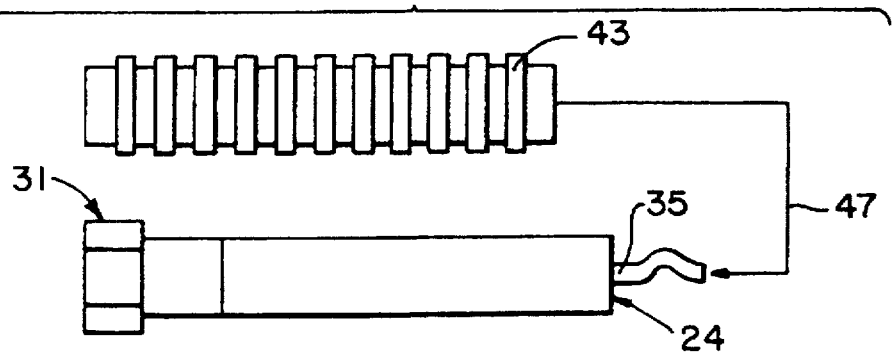

The hose assembly 20 comprises an elastomeric or polymeric part as is typical of the usual garden hose (FIG. 3) and such part of this example comprises a base tube 26, a reinforcing layer 27, and a outer cover 30.

Referring again to FIG. 2, the garden hose assembly 20 has a standard internally threaded or so-called female connector 31 fixed thereto and defining one terminal end thereof and a standard externally threaded or so-called male connector 32 fixed thereto and defining the opposite terminal end thereof. The connectors 31 and 32 are suitably fixed in position utilizing any known technique known in the art, and in this example of the invention the connectors 31 and 32 have coupling stems (not shown) which are inserted within the base tube 26 and such coupling stems are then radially expanded into ferrules or corrugations 33 and 34 comprising the connectors 31 and 32 respectively, as is known in the art, to fix the connectors 31 and 32 in position. The internally threaded outer portion 38 of the connector 31 is rotatable relative to the rest of such connector as is known in the art.

The holding means 25 of the hose assembly 20 comprises a deformable metal wire 35 which is capable of being repeatedly deformed and straightened without breaking, and in this example of the invention the wire 35 is made of 1350 aluminum alloy and has a outside diameter of 3/16". However, any suitable deformable wire-like material may be used.

The hose assembly 20 has means supporting the wire 35 on the portion of such hose assembly 20 and in this exemplary embodiment of the invention the supporting means is defined by parts of the inside surface means or surface 23 defining the fluid passage 24 and such parts of the inside surface 23 are designated by reference numerals 36 and 37 respectively in FIG. 2. The supporting means also comprises a pair of bent ends comprising opposite ends of the wire 35 and each of such bent ends is designated generally by the reference numeral 40. Each of the bent ends 40 engages an associated part of the inside surface, 36 or 37, and supports the wire 35 substantially centrally within the portion of the hose assembly 20 and hence the water conveying passage 24 of such hose assembly.

Each bent end 40 of the wire 35 comprises a roughly V-shaped portion defined by a bight 41 and a pair of legs each designated by the same reference numeral 42 extending from opposite ends of the bight. The legs 42 extend from the outer ends of the bight 41 and blend smoothly with the terminal ends of the wire 35 and such terminal ends are initially disposed substantially coinciding with the longitudinal axis of the passage 24 through the hose assembly 20.

The hose assembly 20 also comprises a flexible sleeve 43 disposed therearound and such sleeve 43 is a corrugated sleeve and is made of a suitable plastic material. The sleeve 43 is compressed between stops comprising the hose assembly and in particular the sleeve 43 is compressed between an annular stop 44 comprising the coupling 31 and an annular stop 45 comprising the coupling 32. The stops 44 and 45 are defined by annular surface means comprising the connectors 31 and 32 respectively.

The sleeve 43 serves to protect the hose assembly 20 and in addition does not impair the flexibility of such hose assembly so that the hose assembly 20 may be readily coiled around an associated post such as a post 21 to hold a water spray nozzle N, or the like, in a hands-free manner and enable water to be sprayed or otherwise directed in any desired hands-free manner.

The garden hose assembly 20 may be made using any suitable technique known in the art. However, such water hose assembly is preferably made utilizing essentially the steps and procedures illustrated in FIGS. 4-7 of the drawings.

Figure 6:
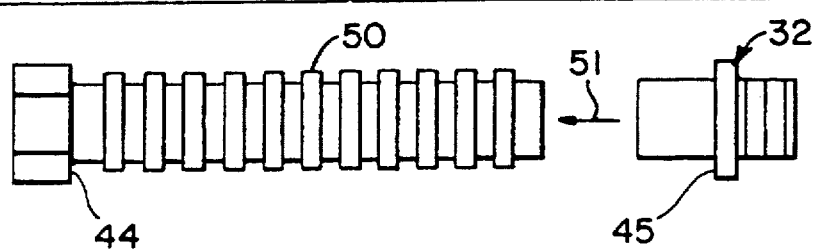
Figure 7:
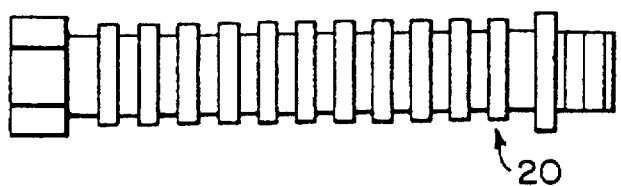

In particular, the female fitting or coupling 31 is installed or coupled at one end of the assembly 20 essentially as previously described. The wire 35 with its ends bent to define bent ends 40 is then inserted in the passageway 24 as illustrated by the arrow 46 in FIG. 4. The flexible sleeve 43 is then slid concentrically around the assembly as shown by the arrow 47 to define the subassembly 50 as shown in FIG. 6. The coupling 32 is then moved in position as illustrated by the arrow 51 in FIG. 6 and suitably installed in position in the manner previously described to define the completed assembly 20 illustrated in FIG. 7. Alternatively, the coupling 31 may be installed in position in the subassembly of FIG. 3, the sleeve 43 is then installed in position and then the coupling 32 is installed while axially compressing the sleeve 43 between stops 44 and 45. Lastly, the wire 35 with its bent ends 40 is then disposed within passage 24.

The length of the flexible sleeve 43 is such that it is necessary to axially compress such sleeve as the male coupling 32 is installed in position. This manner of installing and holding the sleeve 43 in position results in assembly 20 which is comparatively inexpensive to produce and yet provides optimum protection for the interior components of the hose assembly 20.

Other exemplary embodiments of the garden hose assembly of this invention are illustrated in FIGS. 8, 9-10, and 11-13. The garden hose assemblies illustrated in FIG. 8, 9-10 and 11-13 are similar the garden hose assembly 20; therefore, such garden hose assemblies will be designated by the reference numerals 20A, 20B, and 20C in FIG. 8, 9-10 and 11-13 respectively. Likewise, component portions of each garden hose assembly which are similar to corresponding portions of the garden hose assembly 20 will be designated in the drawings by the same reference numerals as in the assembly 20 whether or not such component portions are mentioned in the specification followed by the associated letter designation, either A, B, or C; and not described again in detail. Only those component portions of each garden hose assembly which are different from corresponding portions of the garden hose assembly 20 will be designated by a new reference numeral also followed by the associated letter designation and described in detail.

Figure 8:
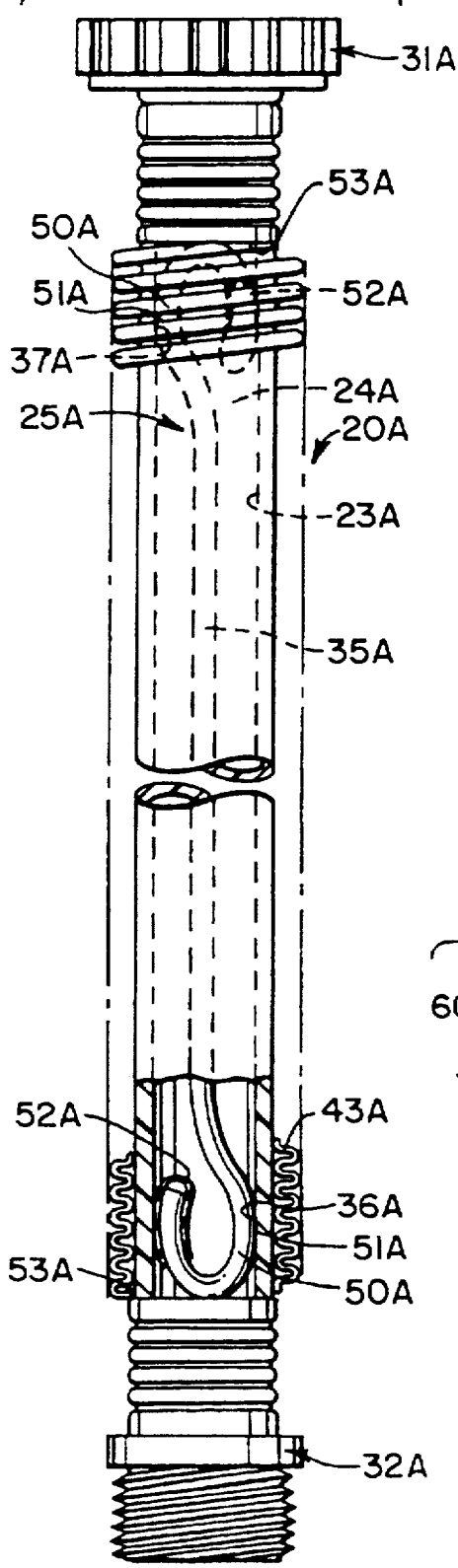
FIG. 8 is a view similar to FIG. 2 illustrating a modification of the garden hose assembly of this invention.

The garden hose assembly 20A of FIG. 8 has inside surface means 23A defining a water-conveying passage 24A therethrough and has holding means 25A comprising at least a portion of the hose assembly 20A with the holding means and portion being adapted to be coiled around an associated support, such as support 21 illustrated in FIG. 1, for holding the portion and in this example the hose assembly 20A at any desired position on the support so that the hose may be used to spray water through an associated nozzle N in a hands-free manner.

The holding means 25A comprises the deformable wire 35A also made of an aluminum alloy or similar suitable material and is capable of being repeatedly deformed and straightened. Means is provided for supporting the wire 35A on the hose portion 20A and in this example of the invention the supporting means instead of bent ends each having a V-shaped configuration are each in the form of a loop-like bent end each designated by the same reference numeral 50A. Each loop-like end 50A has a surface portion 51A which is adapted to engage an associated part 36A or 37A of the inside surface 23A to support the wire 35A substantially centrally within the water conveying passage 24A. Each of the looped-shaped ends 50A has a protective sleeve 52A slid over its terminal end to encase such end and prevent any sharp edges of such end from engaging the inside surface 23A.

The hose assembly 20A has a flexible sleeve 43A made of a plastic material and the flexible sleeve is in the form of a corrugated sleeve and is axially compressed between stops comprising the hose assembly. In this example of the invention the stops are provided as annular stops each designated by the same reference numeral 53A and each of the annular stops is defined by an annular surface 53A which comprises an inner end edge of an associated connector 31A or 32A respectively.

Except for the modification of the wire 35A and the manner in which the flexible sleeve 43A is supported in position between annular stops 53A, the garden hose assembly 20A operates in an substantially identical manner as the garden hose assembly 20 and is assembled in a similar manner as shown in FIGS. 4, 5, 6 and 7 and described for the garden hose assembly 20.

Figure 9:
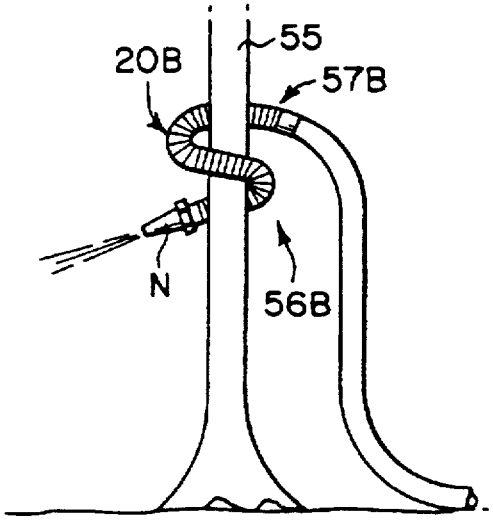
FIG. 9 is a fragmentary view illustrating another exemplary embodiment of the garden hose assembly of this invention held in a position by integral holding means thereof around an associated tree.
Figure 10:
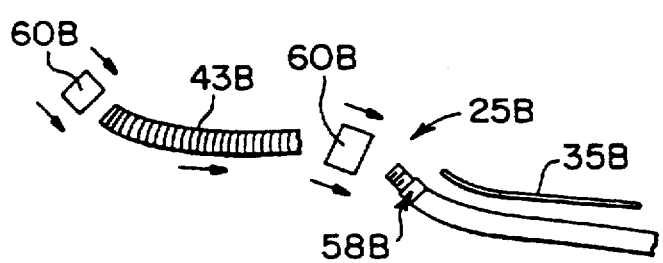
FIG. 10 is a fragmentary view illustrating the components and method of making the garden hose assembly illustrated in FIG. 9.

The garden hose assembly 20B of FIGS. 9 & 10 has holding means shown in FIG. 10 comprising at least a portion thereof and the holding means and end portion of the hose assembly 20B are adapted to be coiled around an associated support such as the trunk of a tree 55 to hold the portion of the hose assembly 20B at any desired position in a hands free manner so to enable a nozzle N thereof to spray water onto an associated object and in any desired manner.

The hose assemblies 20 and 20A have the holding means 25A and 25B respectively comprising the major portion and indeed practically the entire length of the associated hose assembly. However, in the case of the hose assembly 20B the holding means 25B only defines an outer end portion of such hose assembly as illustrated at 56B in FIG. 9 so as to enable the outer end portion of the hose assembly 20B and in particular a comparatively short length portion thereof as illustrated at 57B in FIG. 9 to be coiled around an associated trunk of the tree 55 and hold the nozzle N in position.

The holding means 25B comprises a deformable device in the form of a deformable wire 35B which is capable of being repeatedly deformed and straightened and means supporting the wire 35B on the end portion of the hose assembly 20B at the end adjacent the nozzle end. The supporting means comprises the flexible sleeve 43B and a pair of heat shrinkable tubing ends 60B disposed at opposite ends of the wire 35B. The sleeve 43B is a corrugated sleeve substantially identical in construction to the sleeves 43 and 43A, and it is a simple matter to install the supporting means 25B at the end of the hose assembly 20B adjacent the male coupling 58B where the nozzle N is installed to complete the hose assembly 20B.

In particular it is a simple matter, as illustrated in FIG. 10, to place the wire 35B in position adjacent the male coupling 58B then slide one of a pair of the heat-shrinkable sleeves 60B in position followed by sliding the sleeve 43B in position to surround the wire 35B and then followed by sliding the other of the pair of heat shrinkable sleeves 60B in position. The sleeve 43B is disposed so that it extends over, conceals, and protects the deformable wire 35B therewithin and the heat shrinkable sleeves 60B are placed in position so that roughly one-half of the axial length of each sleeve 60B engages an associated end of the sleeve 43B and the other half of the axial length engages the outside surface of the elastomeric portion of the garden hose therebeneath and this is achieved at each end whereupon the sleeves 60B are heat shrunk in position whereby the supporting means is disposed in position as a portion of the hose assembly 20B.

It is preferable that the axial length of the sleeve 43B is longer than the axial length of the deformable wire 35B so that during coiling of the associated end portion of the hose assembly 20B around tree 55 or similar support the wire 35B can move axially without damage to either the remainder of the garden hose assembly, or the corrugated sleeve 43B, or the heat shrinkable sleeves 60B. It would also be appreciated that, if desired, protective plastic tubular sleeves similar to the sleeves 52A of the hose assembly 20A may be installed at opposite ends of the deformable wire 35B.

The wire 35B, heat shrinkable sleeves 60B, and corrugated flexible plastic sleeve 43B comprising holding means 25B may be provided as a kit and sold to purchasers of garden hose independently of the garden hose to enable home installation of such holding means and supporting means. The heat shrinking of the heat shrinkable sleeves 60B may be achieved with an ordinary household hair dryer, or the like.

Thus it is seen that in contrast to the garden hose assemblies 20 and 20A wherein the deformable wires 35 and 35A respectively are disposed within the water conveying passages of the hose assemblies, the garden hose assembly 20B has deformable wire 35B and has the holding means on the exterior of the hose assembly or an end portion of such hose assembly.

The garden hose assembly 20C of FIGS. 11–13 also has its deformable wire 35C disposed externally of the water conveying passage 24C therethrough. Further, it will be seen that the holding means 25C comprises substantially the entire length of the garden hose assembly 20C. The deformable wire is also in the form of a 1350 aluminum alloy wire and the means supporting the wire 35C in position comprises a pair of band clamps 61C at opposite ends of the garden hose assembly 20C. Each clamp 61C is adapted to have an associated end portion of wire 35C, as shown as 62C, disposed therein prior to crimping of the band clamp around the associated end portion of the wire 35C.

In particular each band clamp has an endless circular configuration provided initially with a U-shaped part 63C, shown in FIG. 13. After installing an end of the wire 35C in an associated U-shaped part 63C such part 63C is crimped utilizing a pair of special pliers P to thereby neck down part 63C as shown as 64C. The crimped necked down part engages and firmly holds an associated end portion of the wire 35C in position as part of the garden hose assembly 20C. The hose assembly 20C also has a corrugated plastic sleeve 43C which is disposed in position around the upper portion of the assembly shown in FIG. 11 and utilizes a pair of heat shrinkable sleeves each designated by the same reference numeral 65C at opposite ends thereof and the sleeves 65C are heat shrunk in position once the corrugated sleeve 43C is disposed around the assembly shown in the upper portion of FIG. 11 to thereby define the completed hose assembly 20C as illustrated in FIG. 12.

The wire 35C that is utilized in the hose assembly 20C may have a straight configuration however preferably it is provided with an undulating spiral or other configuration so as to be readily deformable in position around an associated support and yet the undulations or spiraling thereof will assure that the wire is not extracted from the band clamps 61C at opposite ends of the hose assembly 20C.

In this exemplary embodiment of the invention each wire 35, 35A, 35B, and 35C is preferably made of 1350 aluminum alloy. However, any suitable wire capable of being repeatedly wrapped or coiled around an associated support and straightened without breaking may be utilized and may be made of any suitable material known in the art.

The corrugated sleeve 43, 43A, 43B and 43C may be made of any suitable plastic material However, preferably such corrugated sleeve is made of polypropylene. Each corrugated sleeve preferably has a wall thickness of 0.020 plus or minus 0.005 inch, a minimum inside diameter of 0.925 inch, and a maximum outside diameter of 1.097 inch. The axial length of each crest of each convolution is 0.095 inch and the axial length of each valley or depression between convolutions is 0.035 inch. Except for the thickness dimension, the tolerance for all other dimensions is plus or minus 0.010 inch.

The polypropylene corrugated sleeve of this invention is capable of being axially compressed and is thereby axially deformed in an accordion-like manner and has a normal resiliency whereby the sleeve always tends to expand axially once compressed. This feature allows each sleeve 43, 43A and 43C to be disposed between associated annular supports of associated couplings and self held in position.

The corrugated sleeve of this invention is available from a number of sources. One such source is the OEM/Miller Corporation of 1300 Danner Drive, Aurora, Ohio 44202.

The band clamps 61C comprising the garden hose assembly 20C may be of any suitable type known in the art which are similar to the ones illustrated. One source for such band clamps is Oetiker Inc., 71–77 Okner Parkway, Livingston, N.H. 07039.

The garden hose assemblies 20, 20A, and 20C are of the type which are complete assemblies each usable in association with a typical garden hose assembly of any length from a few feet in length to hundreds of feet in length. Each garden hose assembly 20, 20A, and 20C, may be any desired length, although preferably each may range between roughly eighteen (18) inches to forty-eight (48) inches in length.

The garden hose assembly 20B of FIGS. 9 and 10 has its holding means 25B which may range in overall length from roughly eighteen (18) inches to forty-eight (48) inches and such holding means 25B may comprise a terminal end portion of a typical garden hose ranging in length from a few feet to less than ten feet, for example, to several hundred or more feet.

It will also be appreciated that the above mentioned kit 25B may comprise or be used on any typical garden hose and may be installed at any axial position along the length of such garden hose. For example, midway along the length of a fifty (50) foot garden hose.

Therefore, it can be seen that this invention not only provides a new garden hose assembly and a new method of making same but also provides a new kit capable of being utilized to comprise any ordinary garden hose assembly. Accordingly the garden hose assembly of this invention enables use thereof and watering in a hands-free manner.

The holding means 25, 25A, 25B, and 25C are adapted to be coiled around an associated support at least generally of the order of 180 degrees and may be coiled 360 degrees and more, as desired.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In a garden hose assembly the improvement comprising holding means comprising at least a portion of said hose assembly, said holding means and portion being adapted to be coiled around an associated support for holding said portion at a desired position, said holding means comprising a deformable device and means supporting said device on said portion, said deformable device having restrained opposite ends free of ring-like devices or portions and being unrestrained between said opposite ends.

2. A garden hose assembly as set forth in claim 1 in which said deformable device comprises a deformable metal wire which is capable of being repeatedly deformed and straightened.

3. A garden hose assembly as set forth in claim 2 and in which said supporting means comprises a flexible sleeve disposed around said wire and around said portion of said garden hose assembly.

4. A garden hose assembly as set forth in claim 3 in which said flexible sleeve is made of a plastic material and is disposed around said wire and said portion of said garden hose assembly.

5. A garden hose assembly as set forth in claim 3 in which said flexible sleeve is a corrugated sleeve.

6. A garden hose assembly as set forth in claim 3 in which said supporting means comprises two clamps disposed around opposite ends of said portion with each clamp serving to hold said wire while permitting coiling of said wire and portion around said associated support.

7. A garden hose assembly as set forth in claim 2 in which said supporting means comprises inside surface means of said portion and said metal wire engages said inside surface means.

8. In a garden hose assembly the improvement comprising holding means comprising at least a portion of said hose assembly, said holding means and portion being adapted to be coiled around an associated support for holding said portion at a desired position, said holding means comprising a deformable device and means supporting said device on said portion, said deformable device comprising a deformable metal wire which is capable of being repeatedly deformed and straightened, said supporting means comprising a flexible sleeve disposed around said wire and around said portion of said garden hose assembly, said supporting means comprises a pair of tubes heat shrunk around opposite end portions of said flexible sleeve and sandwiching said opposite end portions against said portion of said garden hose assembly with said wire sandwiched between said sleeve and said portion.

9. In a garden hose assembly having inside surface means defining a water-conveying passage therethrough the improvement comprising holding means comprising at least a portion of said hose assembly, said holding means and portion being adapted to be coiled around an associated support for holding said portion at a desired position, said holding means comprising a deformable device which is capable of being repeatedly deformed and straightened and means supporting said device on said portion, said deformable device having restrained opposite ends free of ring-like devices or portions and being unrestrained between said opposite ends.

10. A garden hose assembly as set forth in claim 9 in which said deformable device comprises a deformable metal wire and said portion comprises a major portion of said garden hose assembly and said holding means is supported and extends along said major portion.

11. A garden hose assembly as set forth in claim 10 in which said supporting means is defined by parts of said inside surface means and a pair of bent ends comprising opposite ends of said wire, each of said bent ends engaging on associated part of said inside surface means and supporting said wire substantially centrally within said portion and hence said water-conveying passage thereof.

12. In a garden hose assembly having inside surface means defining a water-conveying passage therethrough the improvement comprising holding means comprising at least a portion of said hose assembly, said holding means and portion being adapted to be coiled around an associated support for holding said portion at a desired position, said portion comprising a major portion thereof and said holding means being supported and extending along said major portion, said holding means comprising a deformable metal wire which is capable of being repeatedly deformed and straightened and means supporting said wire on said portion, said supporting means being defined by parts of said inside surface means and a pair of bent ends comprising opposite ends of said wire, each of said bent ends engaging on associated part of said inside surface means and supporting said wire substantially centrally within said portion and hence said water-conveying passage thereof, each of said bent ends comprising a roughly v-shaped portion defined by a bight and a pair of legs extending therefrom with the legs having outer ends which blend smoothly with terminal ends of said wire, said terminal ends being initially disposed substantially coinciding with a longitudinal axis of said passage.

13. A garden hose assembly as set forth in claim 11 and further comprising a flexible sleeve disposed around said portion of said garden hose assembly.

14. A garden hose assembly as set forth in claim 13 in which said flexible sleeve is a corrugated sleeve made of a plastic material and is axially compressed between stops comprising said hose assembly and resiliently self held.

15. A garden hose assembly as set forth in claim 14 having an internally threaded connector fixed thereto and defining one terminal end thereof and an externally threaded connection fixed thereto on defining the opposite terminal end thereof, each of said connectors having surface means defining said stops.

16. A garden hose assembly as set forth in claim 15 in which said surface means defining said stops comprise annular surfaces of said connectors.

17. In a method of making a garden hose assembly comprising the step of providing inside surface means defining a water-conveying passage through said hose assembly the improvement comprising the step of providing holding means along at least a portion of said hose assembly, said holding means and portion being adapted to be coiled around an associated support for holding said portion at a desired position said step of providing holding means comprises providing said holding means along said hose assembly, said step of providing holding means comprises providing a deformable metal wire which is capable of being repeatedly deformed and straightened and providing means supporting said wire on said portion, said step of providing said deformable metal wire comprises providing said wire having restrained opposite ends free of ring-like devices or portions and being unrestrained between said opposite ends.

18. A method of making a garden hose assembly as set forth in claim 17 in which said step of providing supporting means comprises providing parts of said inside surface means to define said supporting means, bending opposite ends of said wire to define bent ends, each of said bent ends being adapted to engage an associated part of said inside surface means and support said wire substantially centrally within said portion and hence said water-conveying passage thereof.

19. A method of making a garden hose assembly as set forth in claim 18 and further comprising providing a flexible protective sleeve and disposing said sleeve around said portion of said garden hose assembly.

20. A method of making a garden hose assembly as set forth in claim 19 in which said step of providing said flexible sleeve comprise providing said sleeve in the form of a corrugated sleeve made of a plastic material and axially compressing said sleeve between stops comprising opposite ends of said hose assembly.

21. A method of making a garden hose assembly as set forth in claim 20 and comprising the further steps of fixing an internally threaded connector to define one terminal end thereof and fixing an externally threaded connector to define the opposite terminal and thereof, each of said connectors having annular surface means and defining said stops.

22. In a garden hose assembly the improvement comprising a kit comprising holding means adapted to comprise at least a portion of said garden hose assembly, said holding means and portion being adapted to be coiled around an associated support for holding said portion at a desired position, said holding means comprising a deformable device and means supporting said device on said portion, said deformable device having restrained opposite ends free of ring-like devices or portions and being unrestrained between said opposite ends.

23. A garden hose assembly as set forth in claimed 22 in which said supporting means comprises a corrugated plastic sleeve, and a pair of heat-shrinkable sleeves, said corrugated plastic sleeve being adapted to be disposed around said deformable device and said sleeves being adapted to be heat shrunk in position each about and against an associated end portion of said corrugated plastic sleeve and the outside surface of the elastomeric portion of garden hose therebeneath.

24. A garden hose assembly as set forth in claim 1 in which said holding means is adapted to be coiled around an associated support at least generally of the order of 180 degrees.

* * * * *